(12) United States Patent
Duffy

(10) Patent No.: US 7,261,757 B2
(45) Date of Patent: Aug. 28, 2007

(54) SLIP-RIB FILTER GASKETING

(75) Inventor: Dean R. Duffy, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 305 days.

(21) Appl. No.: 10/920,584

(22) Filed: Aug. 18, 2004

(65) Prior Publication Data

US 2006/0037296 A1 Feb. 23, 2006

(51) Int. Cl.
*B01D 46/00* (2006.01)

(52) U.S. Cl. .............. 55/502; 55/497; 55/506; 55/DIG. 5; 55/DIG. 31

(58) Field of Classification Search ............. 55/493, 55/494, 495, 497, 500, 502, 506, 507, 508, 55/511, 422, 483, DIG. 31; 210/445, 450, 210/451, 493.1; 277/590, 650, 652
See application file for complete search history.

(56) References Cited

U.S. PATENT DOCUMENTS

| | | | |
|---|---|---|---|
| 1,832,281 A | 11/1931 | Davies | |
| 2,032,262 A | 2/1936 | Cori | |
| 2,058,669 A | 10/1936 | Dollinger | |
| 3,296,781 A | 1/1967 | Schumann | |
| 3,513,643 A | 5/1970 | Tarala | |
| 4,386,948 A | 6/1983 | Choksi et al. | |
| 4,497,642 A * | 2/1985 | Hackney | 55/422 |
| 4,538,380 A * | 9/1985 | Colliander | 49/475.1 |
| 4,692,177 A | 9/1987 | Wright et al. | |
| 4,731,047 A * | 3/1988 | Lobb | 493/10 |
| 4,963,171 A | 10/1990 | Osendorf | |
| 4,976,677 A | 12/1990 | Siversson | |
| 5,188,646 A * | 2/1993 | Nolen, Jr. | 55/511 |
| 5,273,563 A * | 12/1993 | Pasch et al. | 55/493 |
| 5,501,794 A | 3/1996 | Van de Graaf et al. | |
| 5,599,446 A | 2/1997 | Junker et al. | |
| 5,603,747 A | 2/1997 | Matuda et al. | |
| 5,618,324 A * | 4/1997 | Sommer et al. | 55/497 |
| 5,704,953 A | 1/1998 | Stemmer | |
| 5,779,747 A | 7/1998 | Schlör et al. | |
| 5,792,229 A | 8/1998 | Sassa et al. | |
| 5,814,219 A | 9/1998 | Friedmann et al. | |
| 5,836,861 A * | 11/1998 | Diaz | 55/511 |
| 5,840,094 A | 11/1998 | Osendorf et al. | |
| 5,902,361 A | 5/1999 | Pomplun et al. | |
| 5,914,413 A * | 6/1999 | Andersson et al. | 55/378 |
| 5,919,122 A | 7/1999 | Geiger et al. | |

(Continued)

FOREIGN PATENT DOCUMENTS

DE 197 46 804 A1 4/1998

(Continued)

*Primary Examiner*—Frank Lawrence
*Assistant Examiner*—Robert Clemente
(74) *Attorney, Agent, or Firm*—Kathleen B. Gross; William J. Bond

(57) ABSTRACT

There is provided a framed filter for insertion into a filter housing having a frame surrounding at least part of a filtration media with a fluid inlet face and a fluid outlet face, the frame comprising at least one longitudinally extending sidewall portion provided with one or more flexible side seals which side seal is provided with at least one longitudinally extending rib extending in the lengthwise direction of the seal on an outwardly facing surface of the seal.

38 Claims, 4 Drawing Sheets

U.S. PATENT DOCUMENTS

| | | | |
|---|---|---|---|
| 6,136,192 A * | 10/2000 | Booth et al. | 210/450 |
| 6,254,653 B1 | 7/2001 | Choi et al. | |
| 6,406,509 B1 * | 6/2002 | Duffy | 55/492 |
| 6,464,745 B2 * | 10/2002 | Rivera et al. | 55/497 |
| 2003/0066425 A1 * | 4/2003 | Shah et al. | 95/273 |
| 2003/0172633 A1 | 9/2003 | Duffy | |

FOREIGN PATENT DOCUMENTS

| | | |
|---|---|---|
| DE | 265 098 | 3/2000 |
| FR | 2 398 531 | 2/1979 |
| GB | 2286136 | 8/1995 |
| JP | 7-299317 | 11/1995 |
| WO | WO94/11089 | 5/1994 |
| WO | WO96/29138 | 9/1996 |
| WO | WO98/20961 | 5/1998 |
| WO | WO 01/02080 A1 | 1/2001 |
| WO | WO 01/05486 | 1/2001 |
| WO | WO 01/47619 | 7/2001 |

\* cited by examiner

SLIP-RIB FILTER GASKETING

TECHNICAL FIELD

The present invention is directed to a filter framing material and design to create a framed filter product that can easily be inserted into a support housing.

BACKGROUND OF THE INVENTION

Filter products typically include a filtration media and a frame that is sized and shaped to partially enclose and support the filtration media, which framed filter can then be inserted or supported in place, based upon a particular application. Filter frames can be constructed from multiple elements that are assembled together or connected to the filtration media, such as about its perimeter, so as to provide the support and application-specific filter frame. Such frame elements are known to be made from a variety of materials, including metals, plastics, and paperboard. In the case of a rectangular filter product, for example, a rectangular filtration media is surrounded at its four sides by frame pieces that may be connected at the corners and/or connected to the four side edges of the filtration media. The majority of the filtration media is thus capable of use for its filtering ability.

These typical frame elements comprise three-dimensional elements that are sized and shaped to at least partially enclose the filtration media at its edges. The frame may comprise multiple pieces assembled by use of adhesive, welding, friction fit, snap fits, mechanical fasteners. Otherwise, the entire frame or any selective portion thereof may be made integral. That is, a frame portion comprising multiple elements made together may be provided, such as, for example, by an injection molding process. In any case, the one or more frame elements must be assembled and connected with the filtration media by an assembly process. An assembly process, as used herein, is contrasted with an in-line process where elements are brought together in a continuous manner from materials of indefinite length and by which at least an intermediate product combining the continuous materials is created. By indefinite length, it is meant that a material may be provided in many different supply forms, such as, for example, in roll form, but in any case where the length of material supplied is not specifically related to the length that would be needed for a single product application.

A continuous strip of framing material that can be manufactured as an indefinite length and converted into a filter frame is disclosed in the U.S. Pat. No. 6,406,509. Specifically, a continuous strip framing blank can be made by extrusion, the framing blank having a sidewall portion and plural tabs that extend from the sidewall portion to create a u-channel of indefinite length. This channel is then notched to form corners that may further be scored to permit easy bending of the channel at the corners of the filtration media. An important aspect of the continuous strip of framing blank material is that it may easily be made by co-extrusion techniques so that different portions of the framing blank material may have different characteristics. For example, the framing blank material may also include seals of a more flexible material than the frame sidewall and tabs, which combination of features may be made by coextruding different polymeric materials together having appropriate characteristics. To assemble such filter, the continuous strip framing material is cut into discrete frame blanks with predetermined corners and the frame blanks are wrapped about a filter media with an adhesive potting compound at an interface between the filter media and the frame channels.

U.S. application Ser. No. 2003/0172633 discloses continuous strip framing material provided in indefinite length and which is storable as a flat product capable of being wound into roll form. The continuous strip of framing material includes features to create a three-dimensional frame structure about a filtration media similar to that disclosed in U.S. Pat. No. 6,406,509. This material has the ability to make a continuous framing material, while also being in a form which can be effectively stored and supplied as a continuous framing material in a continuous in-line process.

SUMMARY OF THE INVENTION

The invention is directed to a framed filter for insertion into a filter housing having a frame surrounding at least part of a filtration media. The invention frame comprising at least one longitudinally extending sidewall portion provided with one or more flexible side seals which side seal is provided with at least one longitudinally extending rib extending in the lengthwise direction of the seal on an outwardly facing surface of the seal. Generally all side seals are provided with one or more longitudinally extending ribs that are substantially continuous with the side seal. The ribs can be formed of a different material than the side seal on which they are provided and formed of a low friction material such as a thermoplastic polymer. The frame can be formed of discrete frame pieces or be a substantially continuous frame extending around the entire filtration media.

DETAILED DESCRIPTION OF THE PREFERRED EMBODIMENTS

Figure 1:
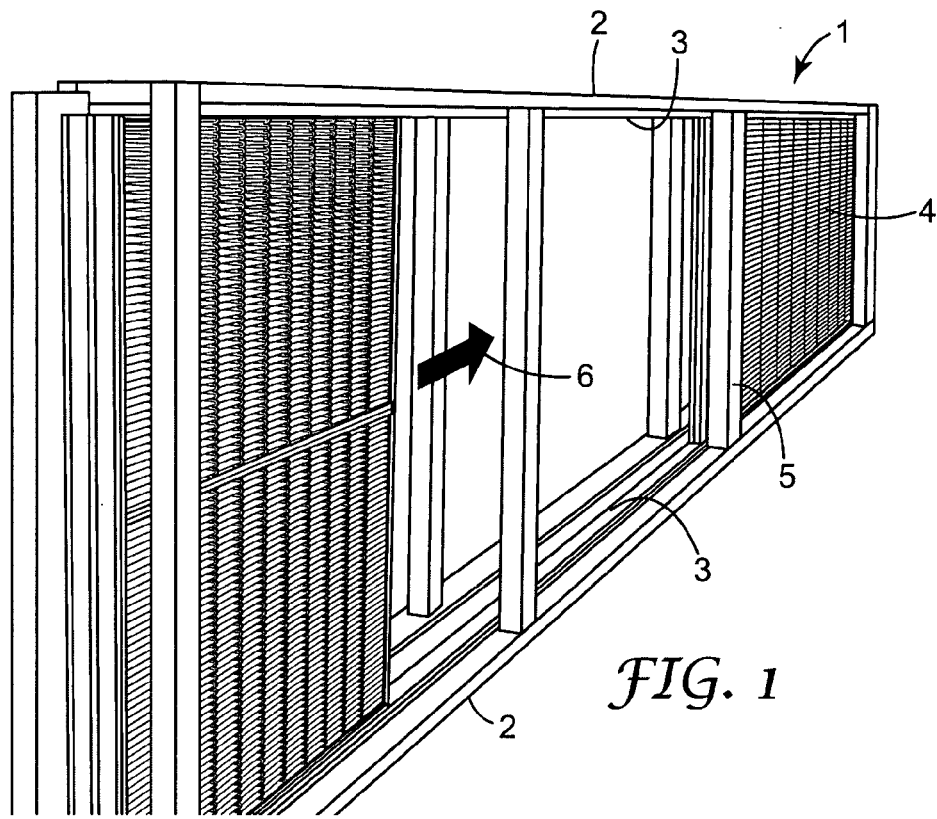
FIG. 1 is a perspective view of the invention framed filter being inserted into a housing.
Figures 2A, 2B:
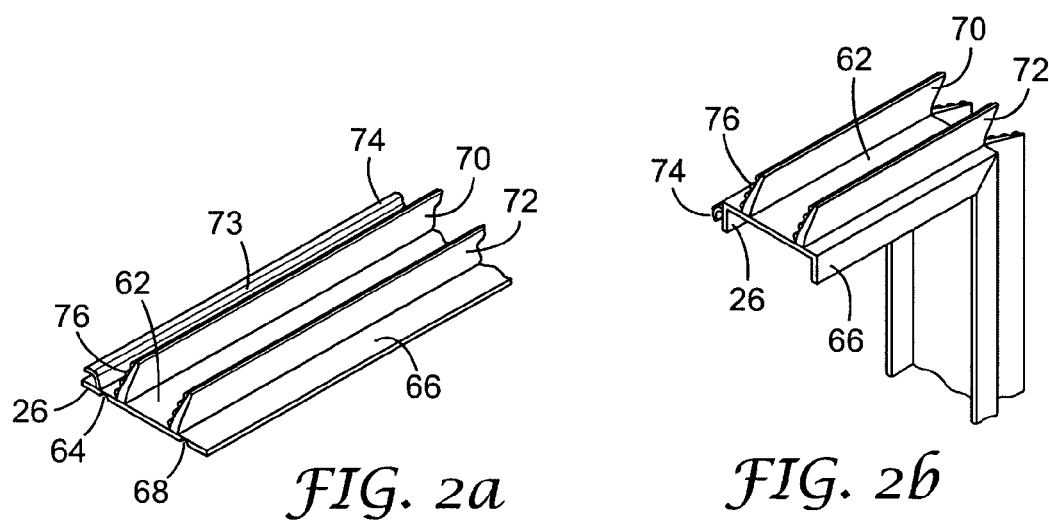
FIG. 2a is an enlarged sectional view of a first embodiment filter framing material in accordance with the present invention.
FIG. 2b is a perspective sectional view of a second embodiment framing material in accordance with the present invention.
Figure 3A:
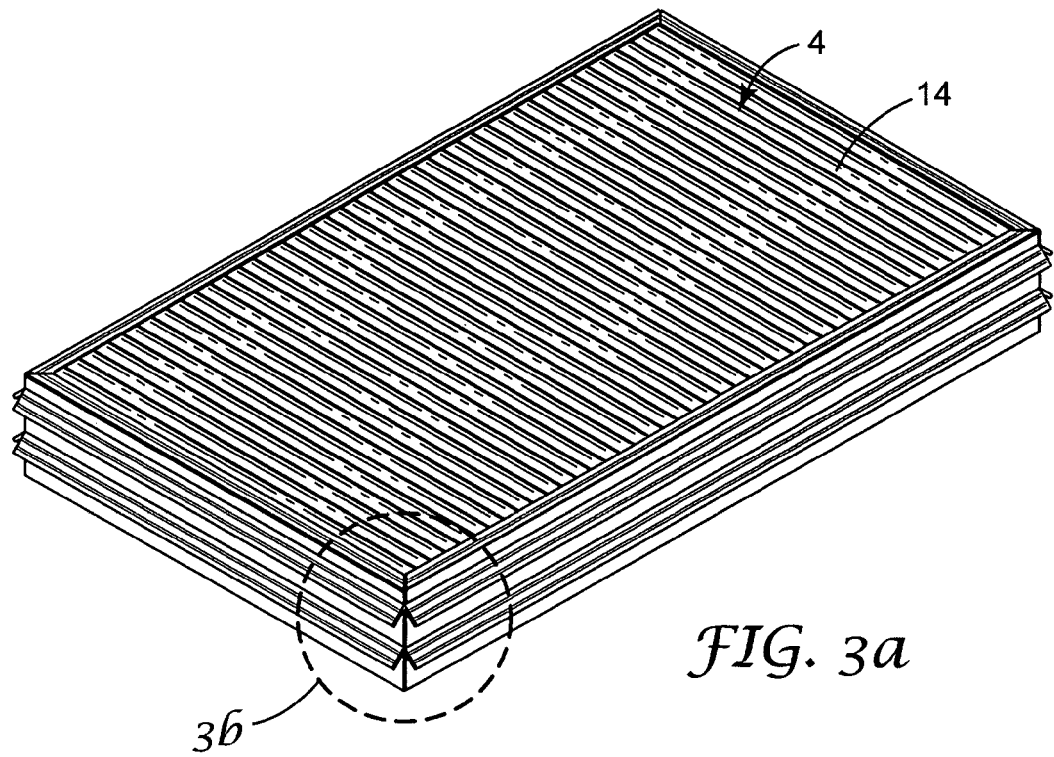
FIG. 3a is a perspective view of an invention framing material around a filter media.
Figure 3B:
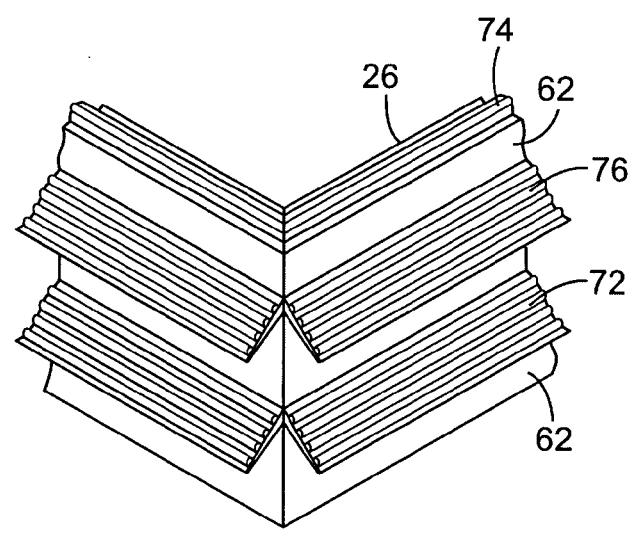
FIG. 3b is an enlarged sectional view of the FIG. 3a framing material.

FIG. 1 shows the invention framed filter 4 being inserted into a filter housing 1. The filter frame is formed of frame sidewalls at least some of which are provided with flexible seals for sealing engagement with the housing. As shown the framed filter 4 slides in a direction 6 along the frame seals in tracks 3 provided in the filter housing sidewalls 2. A single or multiple panels of framed filters 4 can be inserted into a single filter housing 1 by sliding into the housing 1 along the tracks 3 provided in the sidewalls 2. The insertion of the framed filter 4 in the direction shown in FIG. 1 is assisted by the longitudinally extending ribs 76 on the frame side seals 70 and/or 72, as shown in FIGS. 2a and 2b. Alternatively, framed filters can be inserted in a direction transverse or perpendicular to that shown in FIG. 1 where the individual panels are inserted into a suitably sized housing by pushing the filter into the housing at the filter face. The ribs 76 on the sidewall seals 70 or 72 in this case can also ease insertion, while also engage with rivets, mating ribs or other projections on the housing to help hold the framed filter in the housing during insertion into the housing and thereafter. Secondary securing mechanisms can also be used but the ribs can keep the filter from inadvertently falling out during insertion and removal. As shown in FIG. 1 structural rigidity can be provided to the housing 1 by cross-braces 5 or the like.

The longitudinally extending ribs 76 on the frame seals 70, 72 and 74, are shown in FIGS. 2a and 2b. The frame sidewalls 62 are provided with one or more side seals 70 or 72 along the sidewalls. Optionally an edge seal 74 can be provided along edge portions 26 or 66. Preferably the ribs 76 are provided along all the side seals (70 and/or 72), which are intended to slide or engage relative to the housing sidewalls. The one or more ribs 76 are provided along an upper surface of the side seals 70 and/or 72, optionally 2 or more ribs, or 3 ribs or more can be provided. The longitudinally extending ribs 76 can be substantially continuous or intermittent in the lengthwise direction of the seals. Preferably at least one rib provided on each seal is continuous with the seal to prevent fluid bypass. As shown in FIGS. 2a and 2b, the ribs can be discrete and discontinuous on the side seals 70 and/or 72. Alternatively, the ribs 76 could be provided on a substantially continuous film-like material provided with raised rib portions.

Figure 5:
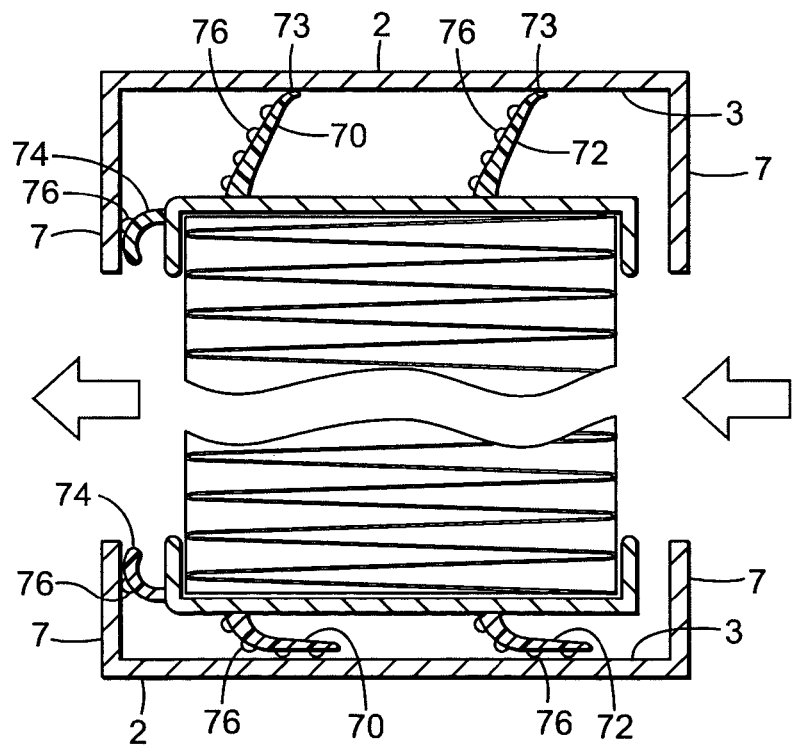
FIG. 5 is a cutaway end view of a framed filter using the second embodiment of framing material in FIG. 2b inserted into a housing.

Ribs 76 are provided on the sealing face of the side seals, which face is oriented outwardly when the seals are compressed against the sidewall portions 62, such as shown in FIG. 5. The outward facing ribs 76 provide a low friction surface, which allows the framed filter 4 to slide into a filter housing. Without the ribs, the flexible seals form a high friction surface that can prevent easy insertion of a filter into a housing, which problem is compounded when multiple filters are slid sequentially into a single housing which could be done with a housing such as shown in FIG. 1. The ribs permit easy insertion of the frame filters into a filter housing while also providing a good level of sealing to the filter housing. The seals generally extend outward from the sidewall or an edge portion as shown (a flange seal) or could have other forms such as a bulb seal, a flat seal, a tubular seal or the like as long as it has an outwardly facing surface which can be provided with ribs.

The ribs are preferably formed of a relatively low friction material such as a thermoplastic polymer such as: polyolefins; such as polypropylene, polyethylene or copolymers thereof; polyesters; polyvinyl chlorides; nylons; polystyrenes; or the like and could be the same or a different material as that forming the side seals 70, 72 or the edge seals 74. The ribs can also include low friction additives. Generally, the side seals would be formed of a more resilient material such as a thermoplastic elastomer such as an ABA block copolymers, polyurethanes, polyolefin elastomers, polyurethane elastomers, EPDM elastomers, metallocene polyolefin elastomers, polyamide elastomers, ethylene vinyl acetate elastomers, polyester elastomers, or the like, which would provide a relatively high friction surface. Generally, the ribs are raised from the seal by 0.1 mm or more or from 0.1 to 1 mm, or alternatively 0.2 to 0.5 mm. The ribs generally have a width of 0.5 to 2 mm or 0.7 to 1.5 mm. The material forming the ribs should allow the framed filters to slide into its intended housing with a minimal amount of effort. The ribs are generally provided so that the insertion force can be less than 5 pounds (2.3 Kgs) or less than 2.5 pounds (1.1 Kgs).

Figure 4:
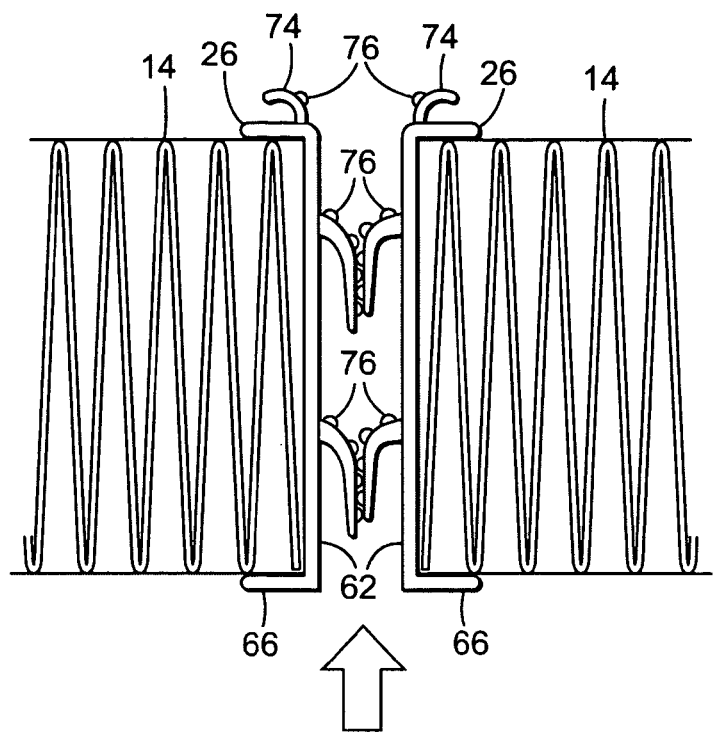
FIG. 4 is an enlarged side view of the end portion of two framed filters using the second embodiment of framing material of FIG. 2b in a mutually abutting relationship.

The edge seals 74 provided on the edge portions can engage an inwardly extending lip 7 of the housing 1 as shown in FIG. 5. The embodiment of FIG. 5 shows the filter media being inserted in a sideways position such that the bottom side seals are compressed under the weight of the framed filter 4. This causes the ribs to engage with the channels 3 of the housing creating a sealing relationship. The sealing relationship of the upper side seals 70 and 72 can be provided by either the ribs 76 or by tips 73 of the upper side seals engaging with the housing sidewall 2. The seals or the ribs would engage with sidewall portions of a housing, such as shown in FIG. 5. Seals can also be provided on frame sidewalls which mate with seals on an adjacent framed filter sidewall portion, such as when provided on abutting multiple framed filters provided in a single housing, such as shown in FIG. 4. Ribs can also be provided on these seals but are not provided to assist in sliding engageability of the filter into the housing. In this case, the ribs help create a superior sealing engagement with the mutually abutting seal elements which seals are pressed into each other upon the force of incoming air as shown by the arrow in FIG. 4. This causes the ribs to lock into each other. Generally the spacing between multiple ribs, when provided, is greater than the width of the ribs when the ribs are intended to interlock with each other.

A method of making framed filters of the invention using extruded frame sidewalls comprises the steps of providing filtration media having a first face, a second face and at least one side edge surface; providing a length of framing material having a sidewall portion having side seals with ribs. The framing material includes at least a longitudinally extending sidewall portion and optionally an edge portion. A length of the framing material is combined with at least a portion of the side edge surface of the filtration media. Optionally, at this point, the edge portion of the strip framing material can be bent inward, if it is initially in the plane of the side edge as shown in FIG. 2(a), so that the edge portion extends generally in a perpendicular direction of the sidewall portion of the strip framing material, and toward the filtration media. The edge portion could also be preformed in its final position with the sidewall portion, such as in a C-shape as shown in FIG. 2(b). The framing material as combined with the filtration media is cut if it is supplied as indefinite length framing material.

Figure 6:
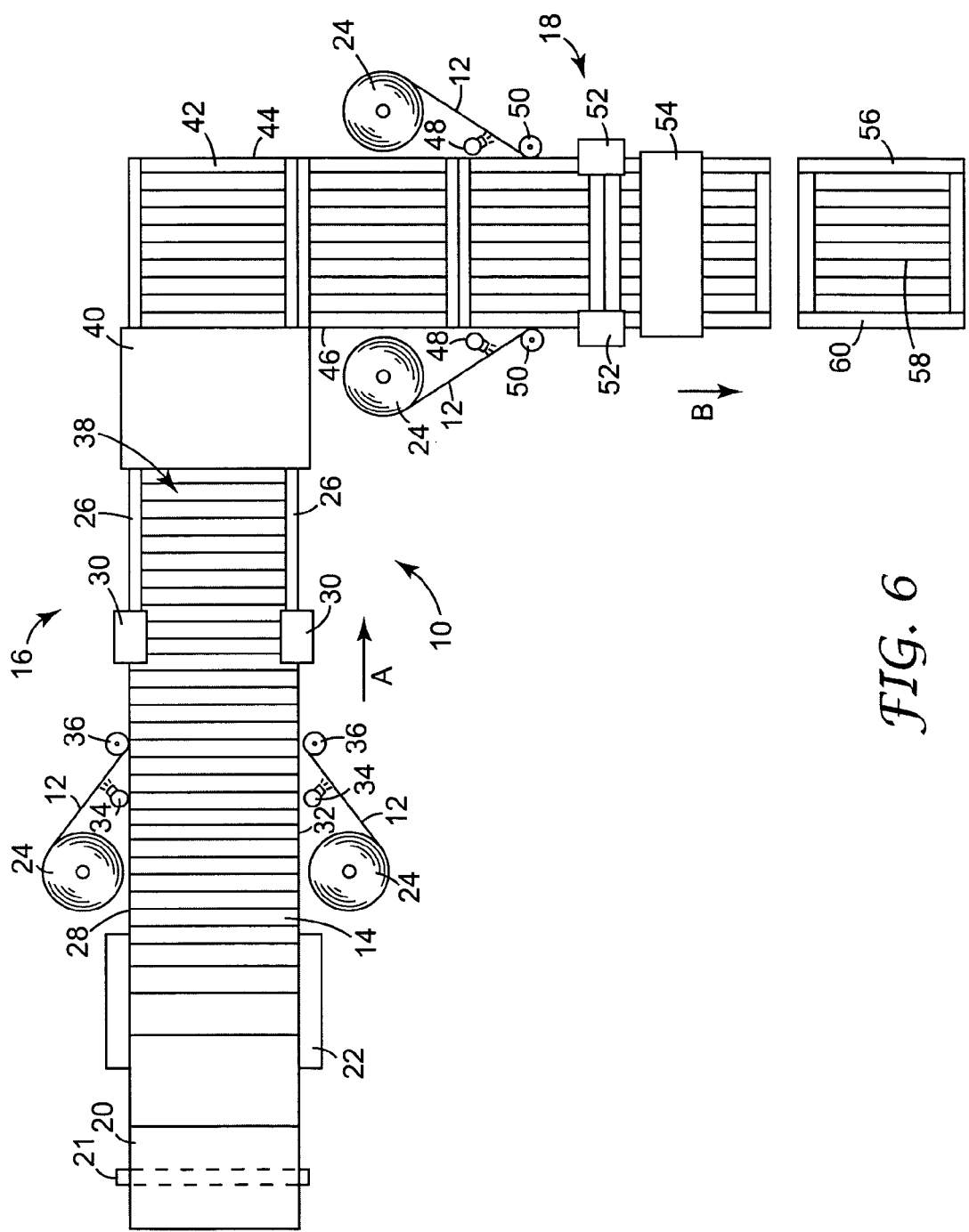
FIG. 6 is a schematic illustration of a system and method for accomplishing the continuous combination of strip framing material and filtration media as an in-line process.

As shown in FIG. 6 a system 10 is provided for combining framing material 12 with a filtration media, such as a pleated filtration media 14, in an in-line process. An in-line process means a process where at least one material, preferably the framing material 12, is supplied from a supply, preferably an indefinite length supply, and brought into the process or an uninterrupted manner for making a plurality of filter products or intermediate products thereof while the materials move in-line. An indefinite length is a length and that is not specifically related to a single filter product or intermediate product. Discrete length frame pieces could also be used, supplied sequentially.

As shown in FIG. 6, the system 10 comprises a first portion 16 for combining framing material 12 with the filtration media 14 along two parallel edges and a second portion 18 for combining framing material 12 to the remaining two parallel edges of the filtration media 14. Specifically, filtration media 14 is illustrated as made up from filtration media 20 that is supplied as a roll, that itself is operatively supported, such as on a rotational axis 21, that may be driven, braked or freely rotatable, and from which filtration media 20 can be unwound. Pleated filtration media 14, as illustrated in FIG. 6, is converted from the filtration media 20 at a pleating station 22 into pleated filtration media 14. Such pleating mechanisms are conventional and well known. Typically, the pleating station 22 includes a device for creating the folds of the supplied material at specific intervals and holding the folded material in place as formed, such as by a screw holding mechanism.

Although FIG. 6 illustrates a system 10 for combining strip framing material 12 to pleated filtration media 14, it is specifically contemplated that any other types of filtration media can be utilized. The filtration media 20, whether pleated or utilized in substantially flat state or otherwise, can comprise open cell structures, porous layers, or the like, any of which can comprise any known or developed materials, such as porous foams, non-wovens, papers, or the like, alone or in combination with one another.

The framing material 12 can be provided in rolls 24. The pleated filtration media 14 can be conveyed continuously in its machine direction (in the direction of arrow A in FIG. 6) while framing material 12 is unwound from at least one supply roll 24. If the framing material 12 is provided in a different form than a roll 24, likewise, the framing material 12 can be supplied in any known or developed way.

A framing material 12 can be provided in roll form in which case it is preferably generally flat such as shown in FIG. 2(*a*) so that it may be wound upon itself. The framing material 12 can include at least one edge portion 26 that may be bent to overlie at least an edge portion of the pleated filtration media 14 along either its top or bottom. As illustrated in FIG. 6, at least a first surface of the pleated filtration media 14 is partially covered by the edge portion 26 of the strip framing material 12 after it is brought into engagement with a side edge 28 of the pleated filtration media 14. An edge folding device 30 is schematically illustrated for bending the edge portion 26 over the edge of pleated filtration media 14. Preferably, both first and second edge surfaces of the pleated filtration media 14 are partially covered by edge portions of the strip framing material 12 by being bent in place by an edge folding device 30. Additionally, in order to provide a frame entirely around the filtration media, a parallel side edge 32 is also preferably combined with strip framing material 12 in the same preferable way.

An adhesive may be applied, such as by spraying, direct application, or transfer coating, to some or all of the inside surface of each strip of framing material 12 prior to contact with the edges 28 and 32 of the pleated filtration media 14. In one embodiment, adhesive spray nozzles 34 are illustrated that are operatively positioned and supported so as to spray adhesive to the inside surfaces of the strip framing material 12 just prior to contact with the edges 28 and 32 of the filtration media 14. Pressure rollers 36 are also preferably provided for applying the strips of framing material 12 under pressure to the filtration media edges 28 and 32. By applying such adhesive to substantially the entire inside surface of each strip of framing material 12, it is possible to effectively seal the filtration media edges 28 and 32 to the framing material 12. Moreover, the adhesive can be utilized for holding the one or more edge portions 26 in their bent orientation. This can be done by way of the bent edge portion 26 adhering to the top or bottom edge surfaces of the filtration media 14 and/or by way of the adhesive itself holding the bent edge portion 26 in place once the adhesive has cured.

The framing material 12 may be supplied with a coating of adhesive that has been pre-applied. Moreover, the tackiness of such adhesive may be rendered inactive to be activated just prior to application. Then, prior to contact with the side edges 28 and 32 of the pleated filtration media 14, the adhesive could be activated such as by heat (i.e. raising its temperature above its softening point) for a hot melt adhesive so as to be tacky for adhering the framing material strips 12 to the pleated filtration media 14. Heat may be supplied by any conventional means (not shown), such as a hot air nozzle, IR source, radiation source, microwave energy, and the like.

It is also contemplated that other means may be used besides adhesive for combining the framing material strips 12 to the side edges 28 and 34 of the pleated filtration media 14. Depending on the materials used, and the similarities of characteristics required, welding techniques may be utilized. For example, ultrasonic welding or any other thermal welding process may be used where similar polymeric materials are utilized for the pleated filtration media 14 and the framing material 12. Even if the materials do not permit welding of the framing material 12 to the filtration media 14, such a welding or bonding process can be utilized for locking the bent edge portion 26 in place regardless of what other technique is utilized for combining the filtration media 14 with the framing material strips 12. Other retention means, such as mechanical clips and fasteners may also be used alone or in combination with any of the above techniques depending on the quality of the filter to be obtained and the specific application thereof, which retention means may be utilized for either or both of the techniques to connect framing material strips 12 to the filtration media 14 and/or for locking the bent edge portion 26 in position.

The intermediate filter product 38 preferably continues to run in the machine direction A shown in FIG. 6 to a cutting station 40. The cutting station 40 can sever the intermediate product 38 (i.e. the pleated filtration media 14 with one or more side edges comprising the strip of framing material 12) and thereafter defining a series of individual partially completed filter products 42 having filtration media side edges 44 and 46. The cutting station 40 itself may include a rotary blade, guillotine type blade, hot wire cutter, laser cutter, or other known or developed cutting device (none of which are shown).

At this point, the first portion 16 of the system 10 is complete and the second portion 18 begins. That is, it is preferable that the filtration media side edges 44 and 46 are also combined with further framing material 12. System portion 18 is preferably substantially similar to the system portion 16. Starting with the series of partial filter products 42, additional rolls 24 of the framing material 12 are positioned and supported along a direction of conveyance of the partially framed filters 42. The direction of conveyance is shown as arrow B, which direction is substantially perpendicular to the machine direction A. This permits the further combination with the additional framing material 12 without having to reorient the partially framed filters 42. The in-line direction of the system portion 18 can be any direction including the same as machine direction A of system portion 16 provided that the partial filter products 42 are reoriented as necessary for applying addition framing material 12 to the filtration media side edges 44 and 46. Where the partial filter products 42 are other different shapes, the same principles apply taking into account the surface or surfaces to which additional strip framing material 12 is to be applied.

System portion 18 comprises the rolls 24 of the framing material 12, adhesive spray nozzles 48, pressure rollers 50, edge folding devices 52 and a cutting station 54. All of the alternatives described above and suggested or contemplated in regard to the system portion 16 are equally applicable within the system portion 18 as to any of these elements and alternatives thereto. In this case, however, the cutting station 54 needs only to sever the one or more framing material 12 as they are applied to the filtration media side edges 44 and 46. The filtration media 14 is already separated into the distinct filters that make up the partially framed filters 42.

Preferably, and as illustrated at the end of system portion 18, any number of filter products 56 are made. As shown, each filter products 56 comprises a filtration media portion 58 that is preferably completely surrounded by a frame 60. In the case of a rectangular filtration media portion 58, four pieces of the frame 60 are made from pieces of the framing material 12 as applied from four different supplies 24. Where it is desirable depending on specific applications, the frame 60 may only partially surround the filtration media portion 58. The same is true for other shapes that may include curved edge surfaces and combinations of linear and curved edges.

It is also contemplated that a continuous strip framing material 12 may be applied sequentially to more than one edge surface of a shaped filtration media without having to reorient the filtration media. For example, by utilizing a sufficiently flexible material for a continuous strip framing material 12, the continuous strip framing material 12 can be wrapped about one or more corners sequentially. Any cutting, notching, scoring, and the like may be conducted on an indefinite length of continuous strip material 12. Moreover, mechanisms have been developed for material, such as adhesive tape, to be applied about a corner of an object. For example, for sealing boxes with tape, many different taping heads have been developed for applying and cutting tape as supplied from a roll over one or more box corners. Such devices are known for applying a C-clip of tape or an L-clip of tape depending on whether the tape is applied over one or two box corners. It is contemplated that similar mechanisms could be used for applying the continuous strip framing material over one or more filter media edge surfaces, if exposed, with corners in between. Curved edge surfaces may be similarly combined with strip framing material.

The framing material used in the invention has one or more side seals, which preferably extend entirely along the sidewall portion 62 of the framing material so that the resultant frame will include such side seals around its complete framed perimeter. In a similar sense, a face seal 74, if provided, preferably extends continuously along any edge portion 26 to create a perimetric face seal for the resultant frame. The seals 70, 72 and 74 are preferably more flexible than the material comprising the sidewall portion 62 and the edge portions 26 and 66. As shown in FIG. 2a, these seals 70, 72 and 74 are flattened against the sidewall portion 62 and edge portions 26 and 66 so that the strip framing material 12 is substantially flat for winding as a roll.

It is also contemplated that the seals 70, 72 and 74 may comprise different materials than the sidewall portion 62 and edge portions 26 and 66 and/or the ribs 76. This can be accomplished by a co-extrusion process, such as described in the commonly owned U.S. Pat. No. 6,406,509, the entire disclosure of which is hereby incorporated by reference. Likewise, it is contemplated that the sidewall portion 62 and edge portions 26 and 66 may themselves be formed of different materials from one another or within each.

Also, depending on the performance characteristics needed for the filter products to be made, more or less adhesive may be coated by weight onto the inside surfaces of the framing material 12. Typically, heavier coating weights are utilized where higher filtration standards are needed so as to very effectively seal the pleated filtration media 14 to the sidewall portion 62 of the framing material 12. Also, depending on the type of filtration media 20, more or less adhesive may be desirable. With a pleated filtration media 14, care must be taken so that all of the length of edges of the pleats are adhered effectively to the sidewall portion 62 for high-performance filtration standards. Thinner and/or continuous edge filtration media may require adhesive over only a portion of the sidewall portion 62 to provide an effectively sealed edge.

The filter frame for the framed filter 4 can also be formed by other known techniques such as molding, casting or combinations of techniques including extrusion or lamination. The frame, whether continuous or in predetermined discrete lengths, can be combined with a filtration media or assembled into a self supporting shape by any known mechanized or manual process.

COMPARATIVE EXAMPLE C1

Two extruders were connected to a feed block/coextrusion die assembly capable of producing a continuous strip frame material, including a seal. Sidewall and edge portions of the strip frame material were 0.75-1.00 mm thick, the sidewall portion of the strip frame material was 43 mm wide, the edge portions were 7 mm wide, and the seal was 14 mm long and had a tapered profile ranging from 1.5 mm at its juncture with the sidewall to 0.5 mm at its tip. The sidewall and edge portions of the strip frame were formed from "RHETECH", a glass filled polypropylene resin (8% by weight glass) available from Ashland Chemical Co, Dublin, Ohio, which was delivered to the feedblock/die assembly as a molten stream at a temperature of 205° C. from the first extruder. The seal on the strip frame material was formed from "SANTOPRENE", available from Ashland Chemical Co., which was delivered to the feedblock/die assembly as a molten stream at a temperature of 205° C. from the second extruder. Living hinges were formed in the strip frame material by cutting indexed score lines into surfaces of the two sidewalls of the strip frame material. Score lines were cut into the inner, or included surface between the edge portions, and the edge portions concurrently notched to a 90° included angle using a utility knife blade available from Stanley, USA adjusted to cut into the sidewall surface to a depth of approximately 0.15 mm. Score lines and notches were cut into the strip frame materials at intervals of 23.25 inch (59.1 cm) and 23.25 inch (59.1 cm) in an alternating manner, defining frame segments which subsequently become end and side wall portions of the completed framed filter. Indexed score lines were then cut into the opposite, or outer, sidewall surface to a depth of approximately 0.15 mm while concurrently cutting the sealing lip (90° angle) using a rotary knife (available from OLFA, Japan) to complete formation of living hinges. Discrete strip frame blanks were subsequently cut from the continuous strip frame material by cutting the continuous strip at every fourth score line using a combination of the above two cutting methods.

A filter element pleat pack was formed by pleating a portion of a synthetic nonwoven web to arrive at a 23.25 inch (59.1 cm) length by 23.25 inch (59.1 cm) width by 1.6 inch (40 mm) height. The pleat spacing of the pleated filter web was maintained by multiple extruded glue beads across the pleat faces and internal to the pleats.

The scored and notched strip frame blank (described above) was placed in a framing jig. The framing jig comprised of four rectangular aluminum components, each incorporating a cavity to frictionally retain the strip frame blank in register in the framing jig. The four framing jig components were connected by three hinges which allowed the jig to be formed around the pleat stabilizing jig. A pin clip was placed on one edge of these components proximal to their unhinged ends to provide a means for closing the framing jig around strip frame blank.

The framed filter assembly was prepared by inserting a discrete strip frame blank into the framing jig, positioning the living hinges of the frame blank over the hinges of the framing jig. A ribbon of hot melt adhesive (#9041, available from Bostik Findley, Inc., Wauwatosa, Wis.) was dispensed from a Dynatec Hot Melt dispenser at a temperature of approximately 180° C. into the strip frame blank, filling the channel created by the edge portions and the sidewall portions of the strip frame blank to a depth of approximately 0.75 mm. The framing jig was then rotated 90° and formed around the filter element blank, potting the pleated filter edges and end pleats into the hot melt adhesive. The framing jig was tightly closed around the base fixture and a spring steel clamp looped around the two proximal anchors to keep the framing jig tightly registered with the base fixture until the hot melt adhesive solidified. After the adhesive had solidified, the clamp was removed and framed filter separated from the framing and base fixture.

EXAMPLE 1

Example 1 was prepared essentially following the procedure described for Comparative Example C1 with the exception that an additional extruder delivering "PROFAX" (polypropylene available from Basel, West Lake, La.) at a temperature feed stream of 205° C. was added to form the ribs (0.055 inch (1.4 mm) wide by 0.01 inch (0.25 mm) height) on the frame seal portion of the frame.

Slip Test

To measure the force required to slide various filters, the following test was used. The framed filter to be tested was set vertically onto a painted metal surface. A digital scale (Model RGSDS-50, available from Rapala, Minnetonka, Minn.) was attached, via hook on the digital scale, to the central portion of one of the vertical sides of the filter. Weight was also added to the top of the horizontal member of the framed filter. The framed filter, along with the added weight on top of the filter, was then pulled across the painted metal surface, and the force was recorded from the digital scale (Table 1).

TABLE 1

Force Needed to Slide a Filter on the Painted Metal Surface

| | Weight Added on Top of Filter | | | | |
| --- | --- | --- | --- | --- | --- |
| Example | None | 1 lb (0.5 kg) | 2 lb (0.9 kg) | 3 lb (1.4 kg) | 5 lb (2.3 kg) |
| C1 | 6.5 lbs (3.0 kg) | 4.5 lbs (2.0 kg) | 9.0 lbs (4.1 kg) | 8.0 lbs (3.6 kg) | 10.0 lbs (4.5 kg) |
| 1 | 2.5 lbs (1.1 kg) | 1.4 lbs (0.6 kg) | 2.0 lbs (0.9 kg) | 2.0 lbs (0.9 kg) | 2.2 lbs (1.0 kg) |

Using a commercially available filter housing (available from BLC Industries, Louisville, Ky.) that holds five Heating, Ventilating and Air Conditioning (HVAC) filters, Comparative Example C2 and Example 2 were prepared.

EXAMPLE 2

Five framed filters with frame seals of the invention, as prepared in Example 1, were used. One filter was inserted into the track of the housing, followed by a second filter, to push the first filter further into the track. This was done for each of the remaining three filters, until all five filters were properly positioned in the filter housing.

COMPARATIVE EXAMPLE C2

Five framed filters with frame seals, as prepared in Comparative Example C1, were used. One filter was inserted into the track housing, followed by a second filter, to push the first filter further into the track. Unlike Example 2, additional framed filters could not be pushed into the track to properly position all five filters.

I claim:

1. A method of making filtration product comprising the steps of:
   providing a filtration media having a first face, a second face and at least one side edge surface;
   providing a supply of framing material, said framing material including at least a longitudinally extending sidewall portion the sidewall portion provided with at least one coextruded flexible side seal, which side seal has an outwardly facing first face for sealing engagement, said side seal first face having at least one longitudinally extending rib of a low friction material; and
   combining a length of the framing material along at least a portion of a side edge surface of the filtration media.

2. The method of claim 1 wherein the framing material further comprises an edge portion.

3. The method of claim 2 wherein the edge portion is oriented at an angle to the sidewall portion.

4. The method of claim 2 wherein the edge portion is substantially coplanar with the sidewall portion and the method further comprises the step of bending the edge portion inward so that it extends in a direction transverse to the sidewall portion and toward the filtration media.

5. The method of claim 1 wherein the framing material is an extruded thermoplastic material.

6. The method of claim 5 wherein the framing material is supplied in a substantially indefinite length relative to the filter side edge.

7. The method of claim 3 wherein two edge portions with the sidewall form a C-shape.

8. The method of claim 1 wherein the framing material is supplied as an indefinite length with the longitudinally extending sidewall portion and two reorientable edge portions, and a bending step includes bending both edge portions relative to the sidewall portion from first orientations, wherein the edge portions extend generally in a coplanar direction of the sidewall portion of the strip framing material, to second orientations, wherein the edge portions extend substantially perpendicular from the sidewall portion and toward the filtration media.

9. The method of claim 1 wherein the filtration media is attached to the framing material by adhesive.

10. The method of claim 8 wherein the step of providing a framing material comprises supplying the framing material having a layer of adhesive on at least a portion of a surface of the sidewall portion thereof, and the combining step further includes adhering the adhesive on the sidewall portion of the framing material along an edge of the filtration media.

11. The method of claim 9 further including the step of activating the adhesive on the framing material prior to combining the framing material along an edge of the filtration media.

12. A framed filter for insertion into a filter housing having a frame surrounding at least part of a filtration media with a fluid inlet face and a fluid outlet face, the frame comprising at least one longitudinally extending sidewall portion provided with one or more flexible side seals which side seal is provided with at least one longitudinally extending rib extending in the lengthwise direction of the seal on an outwardly facing surface of the seal, wherein the ribs are formed of a different material than the side seal on which they are provided.

13. The framed filter of claim 12 wherein all side seals are provided with one or more longitudinally extending ribs.

14. The framed filter of claim 12 wherein each side seal is provided with two or more longitudinally extending ribs.

15. The framed filter of claim 12 wherein each at least one rib is substantially continuous with the side seal.

16. The framed filter of claim 12 wherein all ribs are substantially continuous with the side seal on which they are provided.

17. The framed filter of claim 12 wherein the ribs are formed of the same material as the side seal on which they are provided.

18. The framed filter of claim 12 wherein the ribs are discrete and discontinuous.

19. The framed filter of claim 12 wherein the ribs are provided on a substantially filmlike material.

20. The framed filter of claim 12 wherein the ribs are formed of a low friction material.

21. The framed filter of claim 12 wherein the ribs are formed of a thermoplastic polymer.

22. The framed filter of claim 12 wherein the side seals are formed of a thermoplastic elastomer.

23. The framed filter of claim 12 wherein the ribs have a height relative to the side seal on which they are provided of from 0.1 to 1.0 mm.

24. The framed filter of claim 12 wherein the ribs have a height relative to the side seal on which they are provided of from 0.2 to 0.5 mm.

25. The framed filter of claim 23 wherein the ribs have a width of from 0.5 to 2 mm.

26. The framed filter of claim 24 wherein the ribs have a width of from 0.7 to 1.5 mm.

27. The framed filter of claim 12 wherein the filter has side seals provided with ribs on at least two opposing side edges of the framed filter.

28. The framed filter of claim 12 wherein the filter has side seals provided with ribs on at least all opposing side edges of the framed filter.

29. The framed filter of claim 12 wherein the filter frame further comprises an edge portion.

30. The framed filter of claim 29 wherein the edge portion extends in a direction perpendicular to the sidewall portion toward the filtration media.

31. The framed filter of claim 30 wherein two edge portions and a sidewall portion form a C-shape.

32. The framed filter of claim 29 wherein the edge portion is provided with a seal having a longitudinally extending rib.

33. The framed filter of claim 12 wherein the filter frame is formed of discrete frame pieces.

34. The framed filter of claim 12 wherein the filter frame is formed of a substantially continuous frame extending around the entire filtration media.

35. The framed filter of claim 29 wherein the edge portion is divided from the sidewall portion by a longitudinally extending living hinge, the living hinge permitting the edge portion to be folded from a first orientation, wherein the edge portion extends generally in a coplanar direction of the sidewall portion of the strip framing material, to a second orientation, wherein the edge portion extends substantially perpendicular from the sidewall portion.

36. The framed filter of claim 35 wherein the living hinge comprises a longitudinal groove extending along one surface of the strip framing material, which grooves becomes closed as the edge portion is moved to its second orientation.

37. The framed filter of claim 31, wherein the sidewall portion of the framing material is attached along an edge surface of the filtration media with the edge portions configured to cover an edge portion of the filtration media.

38. The framed filter of claim 12 further including a layer of adhesive provided between the sidewall portion of the frame and the filtration media.

* * * * *